United States Patent [19]

Gugeler

[11] 4,153,354

[45] May 8, 1979

[54] ANIMATED VISUAL EFFECT ADAPTOR FOR PROJECTORS

[76] Inventor: William G. Gugeler, 200 S. Vance, Lombard, Ill. 60148

[21] Appl. No.: 816,457

[22] Filed: Jul. 18, 1977

[51] Int. Cl.[2] .............................................. G03B 41/08

[52] U.S. Cl. .......................................... 353/122; 353/1

[58] Field of Search .......................... 353/1, 2, 46, 122; 350/4.1; 362/811

[56] References Cited

U.S. PATENT DOCUMENTS

| | | | |
|---|---|---|---|
| 2,214,050 | 9/1940 | Fowler | 353/98 |
| 2,307,202 | 1/1943 | Eddy | 353/1 |

FOREIGN PATENT DOCUMENTS

| | | | |
|---|---|---|---|
| 1233102 | 1/1967 | Fed. Rep. of Germany | 353/1 |
| 1902584 | 8/1970 | Fed. Rep. of Germany | 353/1 |
| 1258575 | 12/1971 | United Kingdom | 353/1 |

*Primary Examiner*—Richard E. Aegerter
*Assistant Examiner*—John W. Shepperd
*Attorney, Agent, or Firm*—Hill, Gross, Simpson, Van Santen, Steadman, Chiara & Simpson

[57] ABSTRACT

An animated visual effect adaptor unit for a still picture projector which has a projection gate for receiving a slide holder between a light source and a projection lens system, comprising an elongate support having a first portion to be received in the projection gate and a second portion which remains outside of the gate and carries a power drive coupled to drive rotatably, a translucent disk mounting a visual effect design across a projection aperture in the first portion and through which a light beam from the source effects projection of the disk design through the lens system and onto a projection surface to provide an animated visual effect as the disk rotates. A second stationary translucent design carrying disk may be aligned with the rotary disk for increased animation effect.

12 Claims, 5 Drawing Figures

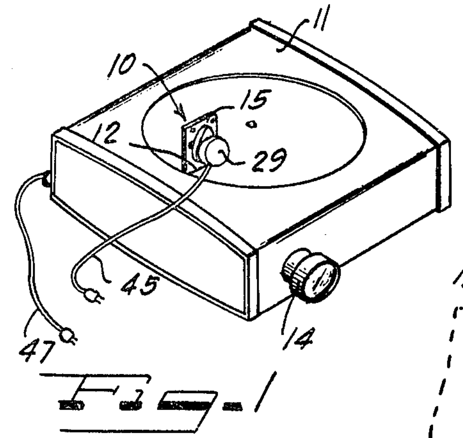
FIG. 1
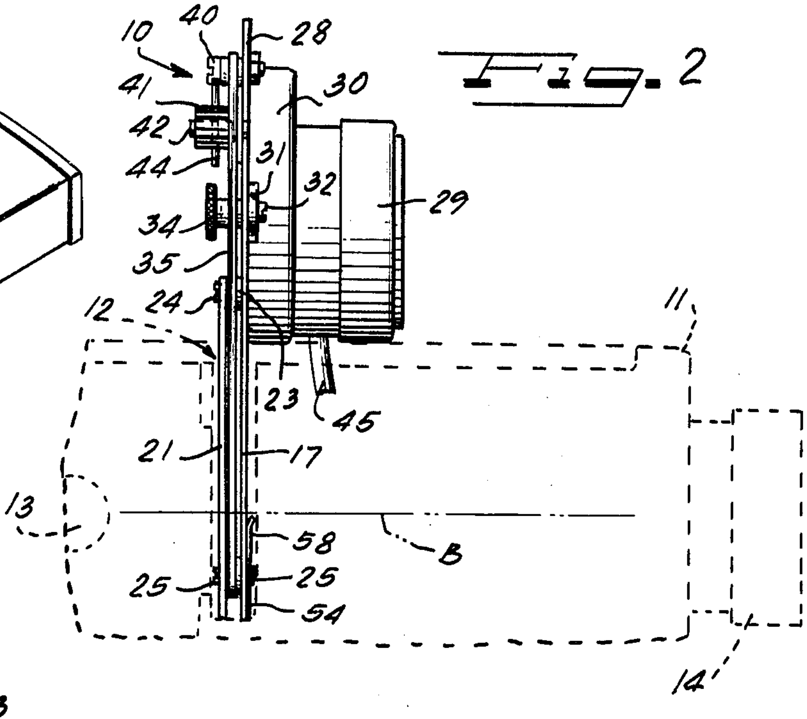
FIG. 2
FIG. 3
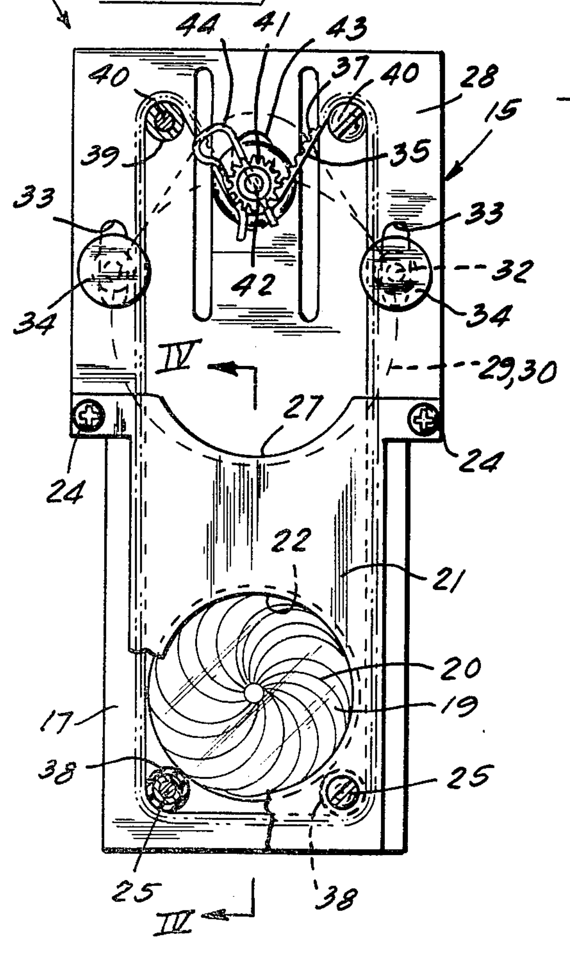
FIG. 4
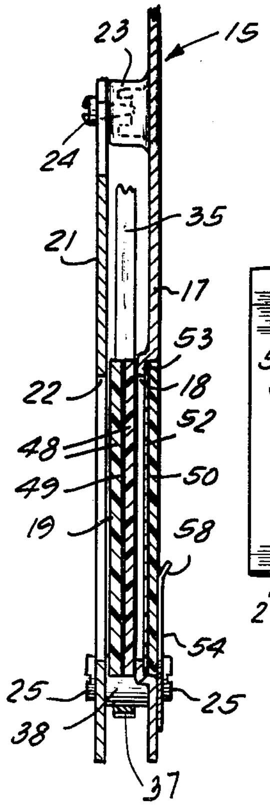
FIG. 5
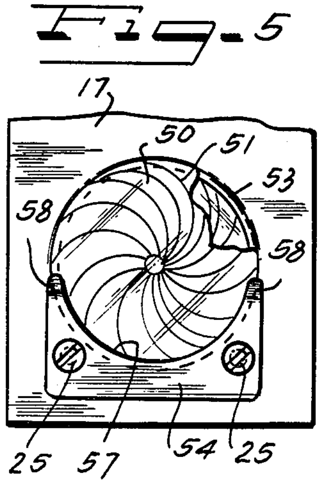

ANIMATED VISUAL EFFECT ADAPTOR FOR PROJECTORS

This invention relates to new and improved means for producing attractive animated visual effects, and is more particularly concerned with a novel adaptor for gated still picture projectors.

Still picture projectors have projection gates for receiving slide carriers or strip film carriers for supporting slides or strip film in front of a light source for projection of a light beam through the slide or film and a lens system in front of the gate onto a projection surface such as a screen or other suitable surface. In the conventional still picture projectors, the projected image is inanimate.

Attachments have been proposed for utilizing projectors of the still picture type to provide animated visual effects by means of bubbling fluid or rotary wheels. However, insofar I am aware prior devices have required special projection equipment, or have necessitated dismantling the lens system or otherwise altering the projector in order to accommodate the animated effects device. The prior devices have also generally been bulky and have had inefficient driving systems. In general, prior devices have not provided adequate adaptability for varying the visual effects produced.

Accordingly, it is an important object of the present invention to overcome the disadvantages, deficiencies, inefficiencies, shortcomings, and problems in prior structures and to provide a new and improved animated visual effects adaptor for gated still picture projectors, taking advantage of the existing gate structure and without requiring any alterations in the projector structures.

Another object of the invention is to provide a new and improved adaptor for attaining animated visual effects with a still picture projector and capable of quickly and easily varying the visual effects attained.

Still another object of the invention is to provide a new and improved adaptor for the stated purpose which is simple in structure efficient in operation and which can be produced and sold at low cost.

According to features of the invention there is provided an animated visual effect adaptor unit for a still picture projector which has a projection gate between a light beam source and a projection lens system, comprising an elongate support having a first portion dimensioned to be received removably in the projection gate, and having a projection aperture for passage of the beam from the source and thence through the lens system onto a projection surface, and first portion having means for supporting a rotary translucent disk extending across said aperture and carrying visual effect design for projection of the design by passing of the light beam through the disk, said support having a second portion which remains outside of the projection gate when said first portion is received in the projection gate, power means carried by said second portion, and a driving coupling between said power means and said disk for rotating the disk to produce an animated effect of the projected design.

The adaptor unit is also desirably equipped to support a second translucent disk carrying complementary visual effect design in alignment with the rotary disk and across the aperture for cooperative animated effect projection during rotation of the rotary disk.

Other objects, features and advantages of the invention will be readily apparent from the following description of a representative embodiment thereof taken in conjunction with the accompanying drawing although variations and modifications may be effected without departing from the spirit and scope of the novel concepts embodied in the disclosure, and in which:

FIG. 1 is an isometric view of an adaptor unit according to the present invention assembled with a representative projector.

FIG. 2 is an enlarged elevational view of the adaptor unit.

FIG. 3 is an enlarged rear elevational view of the adaptor.

FIG. 4 is an enlarged vertical sectional detail view taken substantially along the line IV—IV in FIG. 3; and FIG. 5 is a fragmentary front elevational view of the lower portion of the adaptor unit.

An animated visual effect adaptor unit 10 is depicted in FIG. 1 as assembled in operating relation with a representative still picture projector 11 which may be of the carousel slide projector type having a projection gate 12 between a light beam source 13 (FIG. 2), and a projection lens system 14.

In a preferred embodiment, the adaptor unit comprises an elongate support desirably in the form of a panel or plate 15 which may comprise a stamped metal plate or a molded or otherwise formed plastic plate. A first portion 17 of the support is dimensioned to be received removably in the projection gate 12 and has a projection aperture 18 for passage of the beam from the light source 13 and thence through the lens system 14 onto a projection surface. Means are provided on the first portion 17 for supporting a rotary translucent disk 19 carrying visual effect design 20 across the aperture 18 for projection of the design by passing of the light beam through the disk. For retaining the disk 19 in position concentric with the aperture 18 which is desirably circular and of slightly smaller diameter than the disk 19, the supporting portion 17 carries means at its rear side comprising a disk receiving pocket retainer plate panel 21 in clearance spaced relation. The plate panel 21 has a circular projection aperture 22 concentric with and preferably of about the same diameter as the projection aperture 18. For mounting the panel 21 on the plate portion 17 in suitable spaced relation to receive the disk 19 in freely rotatable relation therebetween, spacer projections 23 may be embossed or drawn in the plate 15 to project from its rear face to the desired extent and to which one end portion of the panel 21, herein the upper end portion as viewed in FIGS. 2-4, is secured as by means of self-tapping screws 24. At its lower end, the panel 21 is desirably coextensive with the plate portion 17, providing a base for supporting the device upright within the gate 12 and with the projection apertures 18 and 22 coaxially aligned with the light beam identified at B in FIG. 2. The lower portions of the plate 15 and panel 21 are secured together in parallel spaced relation by means of suitable two piece spacer screws 25 wherein one portion provides the spacer and the other portion threads into the spacer portion and secures the assembly together. The spacer screws 25 are located adjacent to the lower side of the apertures 18 and 22 and close enough together to serve as cradling support for the lower periphery of the disk 19 which is circular so as to be rotatable. At its upper end, the panel 21 provides with the adjacent portion of the plate 15 an entry or mouth through which the disk 19 is adapted to be inserted into the pocket defined between the plate 21 and the plate portion 17. To facilitate loading the disk 19 into the pocket and removing the same from the pocket when desired, the upper edge of the panel 21 in line with the pocket is desirably concavely recessed as shown at 27.

A second portion 28 of the elongate support 15 remains outside of the projection gate 18 when the first portion 17 is received in the projection gate. Herein the support portion 28 projects upwardly to a sufficient extent to carry power means in the form of an electrical motor 29 and reduction gear means enclosed in a housing 30. Through lateral ears 31 on the housing 30 extend fastening screws 32 projecting through vertical adjustment slots 33 and threaded into internally threaded thumb screws 34 which shoulder against the rear face of the support portion 28 for tightening the ears 31 against the front face of the portion 28 in vertically adjusted position of the motor 29 and the gear box 20. A driving coupling between the power means 29, 30 and the disk 19 includes an endless flexible driving element 35 which may be of any preferred form but desirably comprises a flexible belt having teeth along its length on one side and a linear surface on its opposite side. On its linear side which in this instance is on the inside of the loop of the belt 35, the belt is trained to run about the spacers 25 serve as guide means for the belt, which in this instance is in motivating engagement with rotary friction sleeves 38 rotatably journaled on the spacers 25 and in rotary frictional engagement with the periphery of the disk 19. From the sleeves 38 the belt 35 extends upwardly and is trained over guide means desirably comprising anti-friction sleeves 39 mounted on cantilever screws 40 secured to the panel portion 28 above and spaced to opposite sides of a driving pinion 41 keyed to a drive shaft 42 projecting from the gear box 30 through a vertical clearance slot 43 in the panel portion 28. The belt 35 is looped drivingly about the pinion 41 and the belt teeth 37 mesh with the pinion teeth. Desirably the pinion 41 is removably keyed to the shaft 42 as by means of a hairpin key 44 so that different size pinions can be attached to the drive shaft 42 for different speed ratios. Such interchangeability of pinions is facilitated by having the motor and reduction gear unit adjustably mounted on the panel portion 28 so that the driving unit can be slacked off by loosening the thumb screws 34, the change made and the drive unit then moved to tension the belt 35 and the thumb screws tightened.

A power cord 45 leads from the motor 29 and is adapted to be plugged into a electrical outlet in conventional fashion, as is also a power cord 47 leading to the lamp 13. Assuming the adaptor unit 10 has been mounted with the first portion 17 in the projection gate 12 and the power cords 45 and 47 plugged into an electrical energy source, the motor 29 through the gear reduction drives the pinion 41 and thereby the belt 35 which in turn drives the friction traction sleeves 38 which drive the disk 19 rotatably. It will be understood that rotation of the disk 19 will be at a slow speed depending upon the size of the pinion 41 and its speed and the diameter of the disk 19. A five to one diameter ratio of disk to pinion is desirable but may be varied to suit any preferred arrangement. Driving of the disk 19 at one or two revolutions per minute results in desirable animated visual effect of the projected image, depending upon the particular design 20 carried by the disk.

In one preferred embodiment, the disk 19 comprises a pair of rigid disk elements 48 which may be glass, clear acrylic plastic, or the like having a film 49 laminated therebetween, the film carrying the design 20. Numerous and varied designs may be provided in laminated disks of this type by means of photographic film, desirably of the positive color type available for color photography. For example, in the pinwheel formation of the design 20, the several spiral subdivisions may be differently colored so that the projected image has a varicolored animated pinwheel effect. Such effect can be varied with the same disk by removing the disk from the support pocket and reversing it.

Additional variable effects are attainable by the provision of a second translucent disk 50 carrying visual effect design 51 which may be complementary to the design 20 of the disk 19. In view of the limited space available in the projection gate 12, the disk 50 must be as thin as practicable, and therefore is desirably in the form of a thin rigid plastic or glass disk having attached to one face a thin film 52 carrying the design 51. Where, as is preferred, the film 52 is a photographic film, the emulsion side of the film is disposed between the film and the disk 50 to which the film is laminated. Support for the disk 50 permitting it to be removably mounted on the front of the support panel portion 17, is provided by an inset annular ledge 53 in the front face of the support panel portion 17 providing a recessed socket receptive of the margin of the disk 50 concentrically about the projection aperture 18. Means for retaining the disk 50 replaceably in its recessed seat 53 comprise a thin leaf spring 54 attached as by means of screws 55 to the front face of the support panel portion 17 below the seat 53 and having a concave margin 57 of substantially the same diameter as the aperture 18 engaging a substantial arcuate portion of the lower margin of the disk 50, slightly less than 180° and sufficient to retain the disk 50 removably in its seat. To facilitate mounting and removal of the disk 50, upwardly projecting arms 58 of the retaining spring are biased outwardly to provide lead-in and lead-out cam surfaces.

Where the design 51 of the disk 50 is of a generally pinwheel design complementary to the pinwheel design 20 of the disk 19, interesting and unusual substantially psychedelic animated effects are attained by the design of the rotating disk 19 being projected with the design of the stationary disk 50.

It will be understood that variations and modifications may be effected without departing from the spirit and scope of the novel concepts of this invention.

I claim as my invention:

1. An animated visual effect adaptor unit for a still picture projector which has a projection gate between a light beam source and a projection lens system, comprising:
   - an elongate support structure having a first portion dimensioned to be received removably in the projection gate and having a projection aperture for passage of the beam from the source and thence through the lens system onto a projection surface;
   - said support structure having a second portion which remains outside of the projection gate when said first portion is received in the projection gate;
   - power means attached to said second portion;
   - a rotary translucent disk located across said aperture and carrying projectable visual effect design for projection of said design by passing of the light beam through said aperture and said disk;
   - a driving coupling between said power means and said disk including an endless flexible driving element extending from driven connection with said power means into driving connection with said disk for rotating the disk to produce an animated effect of the projected design;

means carried by said first portion of the support structure adjacent to that end of the first portion which is remote from said second portion, and clear of said aperture for guiding said endless flexible driving element to run about said disk;

and friction means motivated by said flexible driving element and engaged by the perimeter of said disk to effect positive rotation of the disk.

2. An adaptor unit according to claim 1, wherein said elongate support structure is a panel, a complementally apertured spaced member defining a disk receiving pocket with said first portion and in which said disk is located, said friction means comprising rotary friction elements on said guide means driven by said endless flexible driving element and engaged by the perimeter of the disk.

3. An adaptor unit according to claim 1, wherein said power means comprise an electrically driven power device having a drive shaft and a rotary member on said drive shaft drivingly engaged by said endless flexible driving element.

4. An adaptor unit according to claim 3, wherein said rotary member comprises a pinion, and said flexible driving member comprises an endless belt having teeth on one side drivingly engaged with said pinion.

5. An adaptor unit according to claim 1, comprising a second translucent disk mounted in stationary alignment with said rotary translucent disk on said first portion for projection of the light beam through both disks, said second disk also carrying visual effect design.

6. An adaptor unit according to claim 5, including means for supporting the second disk comprising a recessed seat and a spring retainer for retaining the second disk removably in the seat.

7. An adaptor unit according to claim 5, wherein said rotary disk comprises a pair of thin disk elements, having a film carrying the visual effect design and secured in sandwiched relation between the disk elements, and said second disk comprises a single thin disk element having a film secured in laminar relation to one face of the second disk and having the visual effect design on an emulsion protectively sandwiched between the film and the second disk element.

8. An animated visual effect adaptor unit for a still picture projector which has a projection gate between a light beam source and a projection lens system, comprising:

an elongate support comprising a plate having a first portion dimensioned to be received removably in the projection gate and having a projection aperture for passage of the beam from the source and thence through the lens system onto a projection surface;

a rotary translucent disk carrying visual effect design for projection of the design by passing of the light beam through the disk;

said first portion having means comprising a complementally apertured member for supporting said disk to extend across said aperture;

said support having a second portion which remains outside of the projection gate when said first portion is received in the projection gate;

power means attached to said second portion;

a driving coupling between said power means and said disk for rotating the disk to produce an animated effect of the projected design;

a second translucent visual effect design carrying disk; stationary disk-retaining structure on said first portion of the support for mounting said second disk across said aperture in alignment with said rotary disk for projection of the light beam through both of the disks;

means mounting said apertured member in spaced relation to said first portion to define a disk-receiving pocket with said first portion;

said driving coupling including an endless flexible driving element extending from driven connection with said power means into driving connection with said rotary disk;

and said driving connection comprising rotary friction means driven by said endless flexible driving element and engaged by the perimeter of the disk in said pocket.

9. An adaptor unit according to claim 8, in combination with the disks, and wherein said rotary disk comprises a pair of thin disk elements, having a film carrying the visual effect design and secured in sandwiched relation between the disk elements, and said second disk comprises a single thin disk element having a film secured in laminar relation to one face of the second disk and having the visual effect design on an emulsion protectively sandwiched between the film and the second disk element.

10. An adaptor unit according to claim 8, wherein said means for mounting a second disk comprise a recessed seat in said first portion, and a spring retainer for retaining the second disk removably in the seat.

11. An adaptor unit according to claim 8, wherein said power means comprise an electrically driven power device having a drive shaft and a rotary member on said drive shaft drivingly engaged by said endless flexible driving element, and means for adjusting the position of the power device on said second portion for tensioning the endless flexible driving element.

12. An animated visual effect adaptor unit for a still picture projector which has a projector gate between a light beam source and a projection lens system, comprising:

an elongate support having a first portion dimensioned to be received removably in the projection gate and having a projection aperture for passage of the beam from the source and thence through the lens system onto a projection surface;

a rotary translucent disk carrying visual effect design for projection of the design by passing of the light beam through the disk;

said first portion having means for supporting said disk to extend across said aperture;

said support having a second portion which remains outside of the projection gate when said first portion is received in the projection gate;

power means attached to said second portion;

a driving coupling between said power means and said disk for rotating the disk to produce an animated effect of the projected design;

a second translucent visual effect design carrying disk;

said means for mounting the second disk comprising a recessed seat in said first portion;

and a spring retainer for retaining the second disk removably in the seat.

* * * * *

UNITED STATES PATENT AND TRADEMARK OFFICE

CERTIFICATE OF CORRECTION

PATENT NO. : 4,153,354

DATED : May 8, 1979

INVENTOR(S) : William G. Gugeler

It is certified that error appears in the above-identified patent and that said Letters Patent are hereby corrected as shown below:

Column 1, line 53 for "and" read --said--.

Column 6, line 43, for "projector gate" read --projection gate--.

Signed and Sealed this

*Eleventh* Day of *December 1979*

[SEAL]

*Attest:*

SIDNEY A. DIAMOND

*Attesting Officer* *Commissioner of Patents and Trademarks*